May 11, 1965 V. C. FRISBY 3,183,134
TIRE BUILDING APPARATUS AND METHOD
Filed April 3, 1962 4 Sheets-Sheet 2
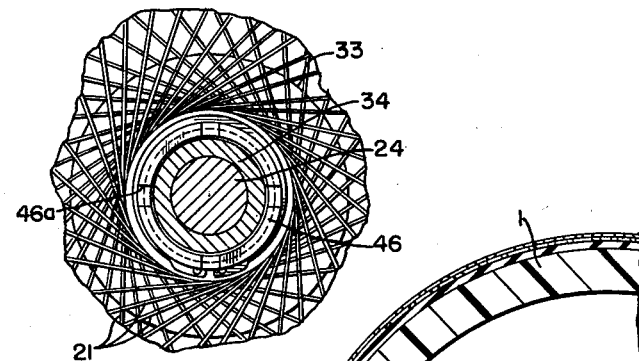
FIG. 2
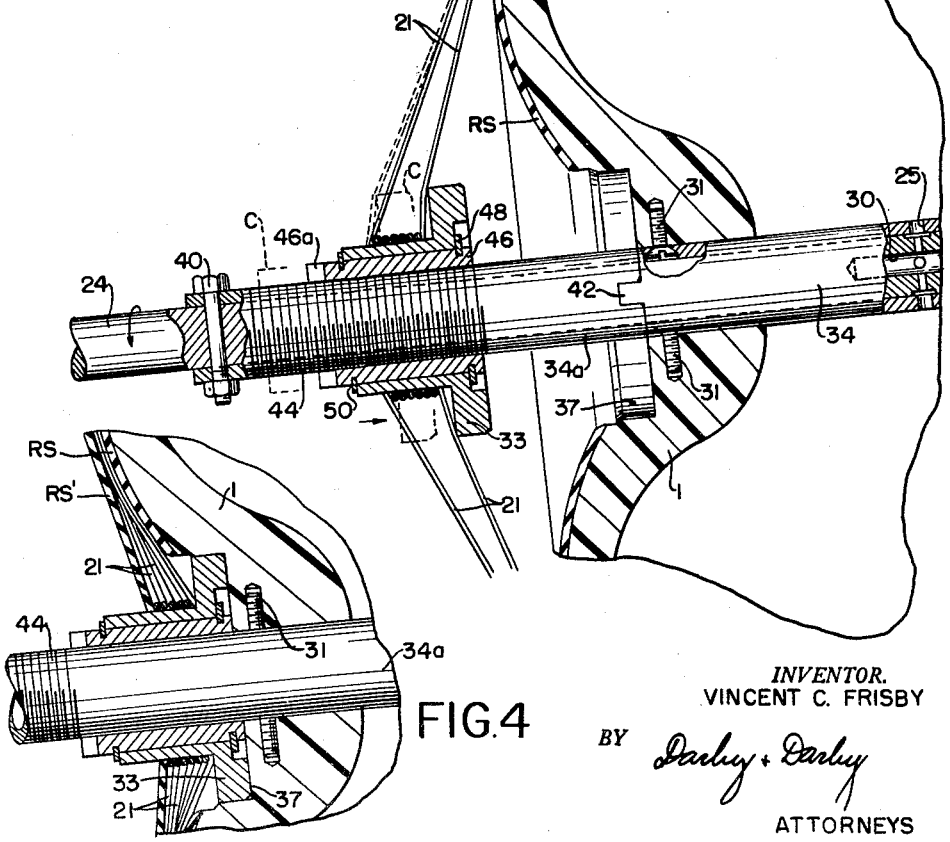
FIG. 3
FIG. 4
INVENTOR.
VINCENT C. FRISBY
BY Darby + Darby
ATTORNEYS May 11, 1965 V. C. FRISBY 3,183,134
TIRE BUILDING APPARATUS AND METHOD
Filed April 3, 1962 4 Sheets-Sheet 3

INVENTOR.
VINCENT C. FRISBY
BY
ATTORNEYS

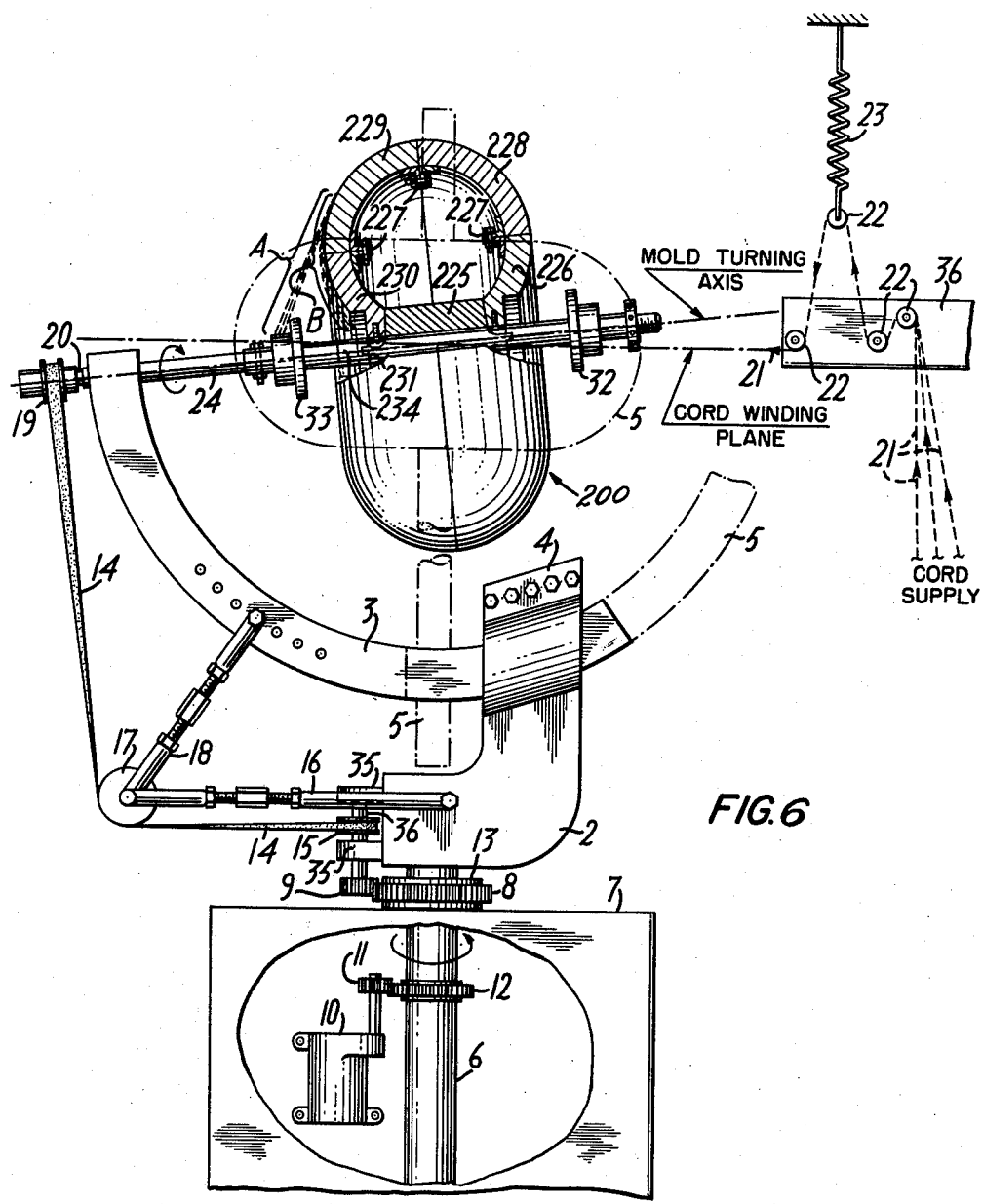

United States Patent Office 3,183,134
Patented May 11, 1965

3,183,134
TIRE BUILDING APPARATUS AND METHOD
Vincent C. Frisby, Great River, N.Y., assignor to Fairchild Hiller Corporation, a corporation of Maryland
Filed Apr. 3, 1962, Ser. No. 184,762
22 Claims. (Cl. 156—117)

This invention relates to apparatus and method for building tires, and more particularly, to a new and improved machine for winding reinforcement cord continuously onto a mold for an aircraft tire.

This application is a continuation-in-part of the United States application of Ralph Simon, John E. Voorhees, Joseph A. Hoess and Vincent C. Frisby, Serial No. 764,578, filed October 1, 1958, now Patent No. 3,052,429 for "High Flotation Landing Gear," and of my copending application, Serial No. 60,981, filed October 6, 1960, for "Tire Building Apparatus" now abandoned.

As pointed out in the above-identified Simon et al. application, certain types of aircraft tires known as "high flotation" or low pressure tires must be sufficiently flexible, so that they provide a large footprint area on the ground at low inflation and also permit folding of the tire while in flight. The inflated shape of the tire in service is determined by the direction and density of the cords throughout the carcass. It is important, also, that all of the individual strands of the cord throughout the tire be stressed an equal amount in the inflated but unloaded tire so that the minimum amount of material is requried. Minimizing the material, both cord and rubber, provides for the thinnest possible carcass and also minimizes the resistance to flexing and the heat build-up in the tire under load. Since high temperature is deleterious to rubber, a method of building tires which positively controls the direction and density of the tire cord throughout the carcass is superior to other methods. The thinner and more flexible carcass also promotes folding the tires, a desirable feature in some applications.

Accordingly, it is an object of this invention to provide apparatus for constructing high flotation tires of the above character.

Another object of the invention is to provide a new and improved tire building apparatus adapted to wind tire cord on a mold in a manner positively controlling the direction and density of the cord in the cured tire and in a rapid and efficient manner.

These and other objects of the invention are accomplished by providing a rotatable mold support adapted to hold a tire mold at a selected axial orientation, a cord supply arranged to supply cord to the tire mold at an angle with respect to the axis of the mold, drive means for imparting relative rotation between the mold support and the cord supply about an axis passing through the mold, and means for rotating the tire mold about its own axis at a predetermined rate with respect to the relative rotation of the mold support and the cord supply. Preferably the cord winding plane passes through the centroid of the tire mold and two hub members, which are axially movable on the mold support, are spaced outwardly from the mold surface to intercept and support the cord on each side as it passes around the mold.

In one embodiment of the invention the cord supply is held in fixed position and both the mold rotation and the rotation of the mold support with respect to the supply are imparted by the same drive motor. Another form of the invention utilizes a first support member for rotating the tire mold and another rotatable support for the cord supply arranged to pass the cord around the tire mold, each being driven by a separate power source.

Further objects and advantages of the invention will be apparent from the reading of the following description in conjunction with the accompanying drawings in which:

FIGURE 2 is a cross-secitonal view on the line 2—2 of FIG. 1, illustrating how the hub members intercept and hold the cord being wound on the mold;

FIGURE 3 is a cross-sectional detailed view showing the axial adjustability on the hub members as the cord winding builds up;

FIGURE 4 is a cross-sectional view showing the position in which the hub members are placed after the cord winding is completed in preparation for completion by further processing including final molding;

FIGURE 6 is a schematic view, partly in section, representing an embodiment of the tire building apparatus of the present invention using a sectionalized mold.

Figure 1:
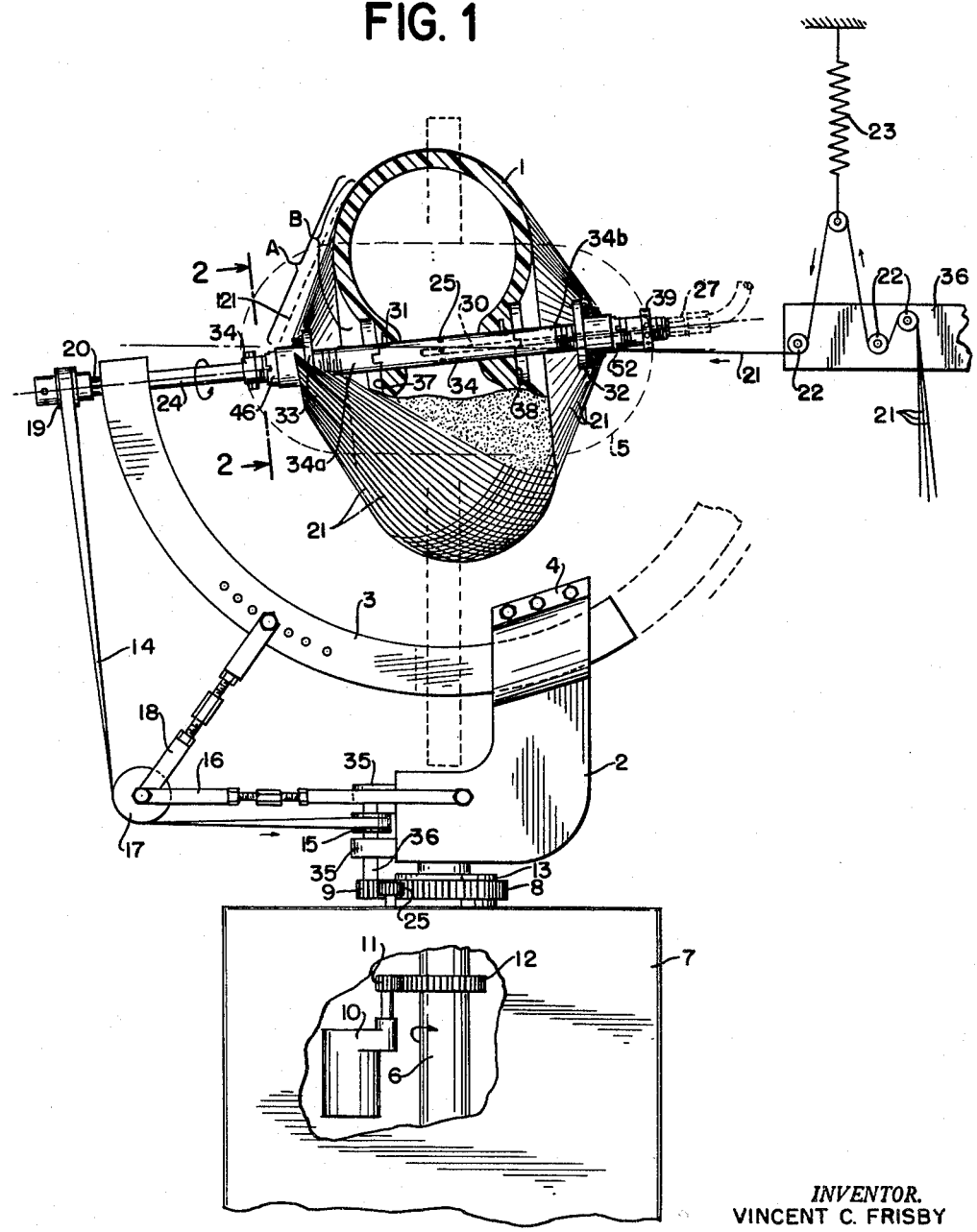
FIGURE 1 is a schematic view, partly in section, illustrating one form of tire building apparatus according to the invention.

In the embodiment of the invention shown in FIGS. 1 to 4, a frangible tire mold 1 is attached, as by radial screws 31, to the central section of a cylindrical three-part splined sleeve 34 which is removably mounted on a spindle or axle 24. In order to support the tire mold at any desired angular orientation, the axle 24 is rotatably mounted in a bearing at one end of a crescent shaped arm 3, and the arm 3 is affixed to the upper end of an L-shaped support member 2 by an adjustable clamp 4, this mounting being arranged so that the centroid of the tire mold is in the same position at all angular orientations of the axle 24.

At the lower end of the support member 2, a vertical drive shaft 6 is affixed to the support member so that the axis of rotation of the shaft and support member passes through the centroid of the tire mold 1. Also, the drive shaft 6, which is supported in a base member 7 and is connected within the base member to a drive motor 10 through gears 11 and 12, passes through a flange 13, which is permanently affixed to the base member and carries a stationary gear ring 8 on its peripheral surface.

In order to drive the mold axle 24 so as to rotate the mold on its axis in conjunction with the rotation of the drive shaft 6, two pillow blocks 35 projecting from the support member 2 carry a vertical axle 36, and a pinion 9 affixed to this axle meshes with the stationary gear ring 8 through the idler gear 25. Also mounted on the axle 36 is a drive pulley 15 and this pulley drives a flexible timing belt 14 which passes around a pair of idler pulleys 17, only one of which is visible in FIG. 1. From the pulleys 17, the belt 14 passes around another drive pulley 19 which is attached to mold axle 24 by a splined joint 20.

In order to hold the drive belt tight at any of the various positions of the crescent shaped arm 3 in the support clamp 4, the idler 17 is supported by two arms 16 and 18 of adjustable length which are pivoted on the support member 2 and the arm 3, respectively. If desired, the pulleys 15 and 19 and the drive belt 14 may be provided with mating teeth to assure accurate timing of the rotation of the axle 24 with respect to the drive shaft 6. Moreover, to facilitate removal of the mold from the axle 24, the arm 3 can be turned in the member 2 so that the axle 24 is in the vertical position, as indicated by the dotted outline 5 in FIG. 1, if the support arm 18 is disconnected from the crescent-shaped arm 3.

Since the cord pattern of tires made in accordance with this invention is unique, including the relatively small bead diameter in reference to the overall diameter of the wound but uncured tire, and because the position of the cords relative to each other should not be changed between winding and curing of the tires, the tire mold cannot be removed from the tire in one piece. For this reason special provisions must be made for facilitating the removal of the mold, which provisions are generally well understood and known in the art. For example, the mold can be sectionalized, that is built up of a plurality of separate pieces which can be easily assembled, and after the tire body is built up, it can be disassembled and withdrawn piece by piece through the bead openings.

Preferably, however, the mold is made of a frangible, moldable, or dissolvable material, so that when in the point of procedure where it is desired to remove the mold, it can either be broken into pieces, melted or dissolved to facilitate its removal. This latter type of mold is sometimes called in the art the sacrificial type. More specifically, for example, the mold 10 can be made of a suitable plastic material sufficiently strong to withstand processing during formation of the tire body, but easily broken into small pieces for removal. As an alternative form of frangible mold it can be made of plaster of Paris, as is well known in the art. If it is constructed of a pliable or moldable material, it can be made of any one of a known number of waxes useful for the purpose, including for example the lost-wax casting method. Finally, if made of a dissolvable material it can be formed of a salt such as sodium chloride which can later be dissolved by the use of a suitable fluid. In all cases, as illustrated in FIG. 1 for example, the mold 10 when made of any of these materials can be suitably attached to the sleeve part 34 by means of the screws 31.

Also, inasmuch as the cord cannot be wound about the mold so as to follow the inward curvature of the mold toward the bead areas the two hubs 32 and 33, one on each side of the mold, are axially positionable on the sleeve 34 and adapted to engage and hold the cord as it is wound. Before winding is commenced, each of these hubs is positioned axially away from the mold surface at a point such that the straight line distance A (FIG. 1) of the cord, when wound on the mold and hubs, will equal the curved line distance B when the hub is moved inwardly against the center portion of the mold so as to place the cord in contact with the mold surface.

In order to supply cord to the mold while it is rotating and turning about the axis 6, a plurality of cords 21 are supplied over a series of pulley groups 22 mounted on a fixed support 36, only one pulley in each group 22 being visible in FIG. 1. The last pulley group in the series is positioned to direct the cords toward the mold 1, in a plane passing through the centroid of the mold in the direction perpendicular to the axis of the drive shaft 6 and, in order to maintain a desired tension on the cords as the mold turns, one of the other pulley groups may be supported by a tensioning spring 23. It is apparent that the point of supply of the yarns 21 to the surface of the mold 1 is the point about which the mold rotates on the axis of shaft 6.

In operation, the mold 1 in the embodiment of the invention shown in FIG. 1 is rotated about the axis of the drive shaft 6, as indicated by the arrow by operation of the motor 10 and as a result of this rotation, the cords 21 are drawn from the cord supply under proper tension and wound about the mold, the ends of the cords having initially been secured to one of the hubs in any desired manner. By reason of the motion of the pinion 9 about the stationary gear 8 the drive pulley 15 is rotated and thus imparts motion to the belt 14, causing the axle 24 and the mold 1 to rotate in conjunction with the bodily motion of the mold about the axis of the shaft 6 so as to distribute the cords about the peripheries of the mold and the hubs, see FIGS. 1 and 2. After the winding has been completed, the hubs 32 and 33 are released from the sleeve 34 and moved inwardly into recesses 37 and 38 in the mold to hold the cords against the mold surface. Thereafter, the crescent-shaped arm 3 may be moved in the clamp 4 to orient the mold to the position 5 shown in dotted lines in FIG. 1 and the completely wound mold can then be removed for further processing by sliding the parts of the sleeve 34 off the axle 24.

The initial position C of the hub members 32 and 33, as mentioned above, is determined by the distance A. As the cords 21 accumulate on the hub members, see FIGS. 2 and 3, the distance from the points of tangency of the cords to the mold surface to their points of interception or engagement and support with and by the hub members 32 and 33 increases if the hub members remain fixed. To avoid this they preferably are mounted so that they can be gradually adjusted inwardly in an axial direction. An arrangement for accomplishing this is shown in FIGS. 2–4.

The lefthand outer part 34a of the three part sleeve 34 is detachably secured to the shaft 24 by a pin or bolt 40. The center part is keyed to it by the clutch formations 42 at the left side and by a similar clutch formation at its other end and the outer righthand part 34b, see FIG. 1. These three parts are clamped endwise by a threaded lock nut 39.

The sleeve parts 34a and 34b are externally threaded as shown at 44 for the part 34a, see FIG. 3. An internally threaded sleeve 46 is adjustably positioned on the threads 44 by applying a spanner wrench to the end of notches 46a. Mounted on the sleeve 46 between the C-spring rings 48 and 50 is the hub member 33. The other hub member 32 is similarly mounted.

In use, the hub members 32 and 33 are gradually positioned inwardly as the cords 21 pile up on them, which is done by stopping the machine at proper intervals and turning the sleeves 46 and 52. Their threaded engagement with the respective sleeve parts 34a and 34b causes the required axially inward movement. The sleeves 46 and 52 can turn inside of the hub members 33 and 32 so that this adjustment does not cause the hub members to turn, which is preferable. After each such adjustment, winding continues. When the winding is completed, the sleeves 46 and 52 are turned until they disengage from the threads on the sleeve parts 34a and 34b, whereupon the hub members can be moved into the mold recesses, as illustrated in FIG. 4. As shown, hub members 33 and 32 are seated in the recesses 37 and 38, respectively.

This adjustment feature insures that when the cords are positioned as shown in FIG. 4, in preparation for further processing, they will be held under the tension put in them during winding.

Figure 5:
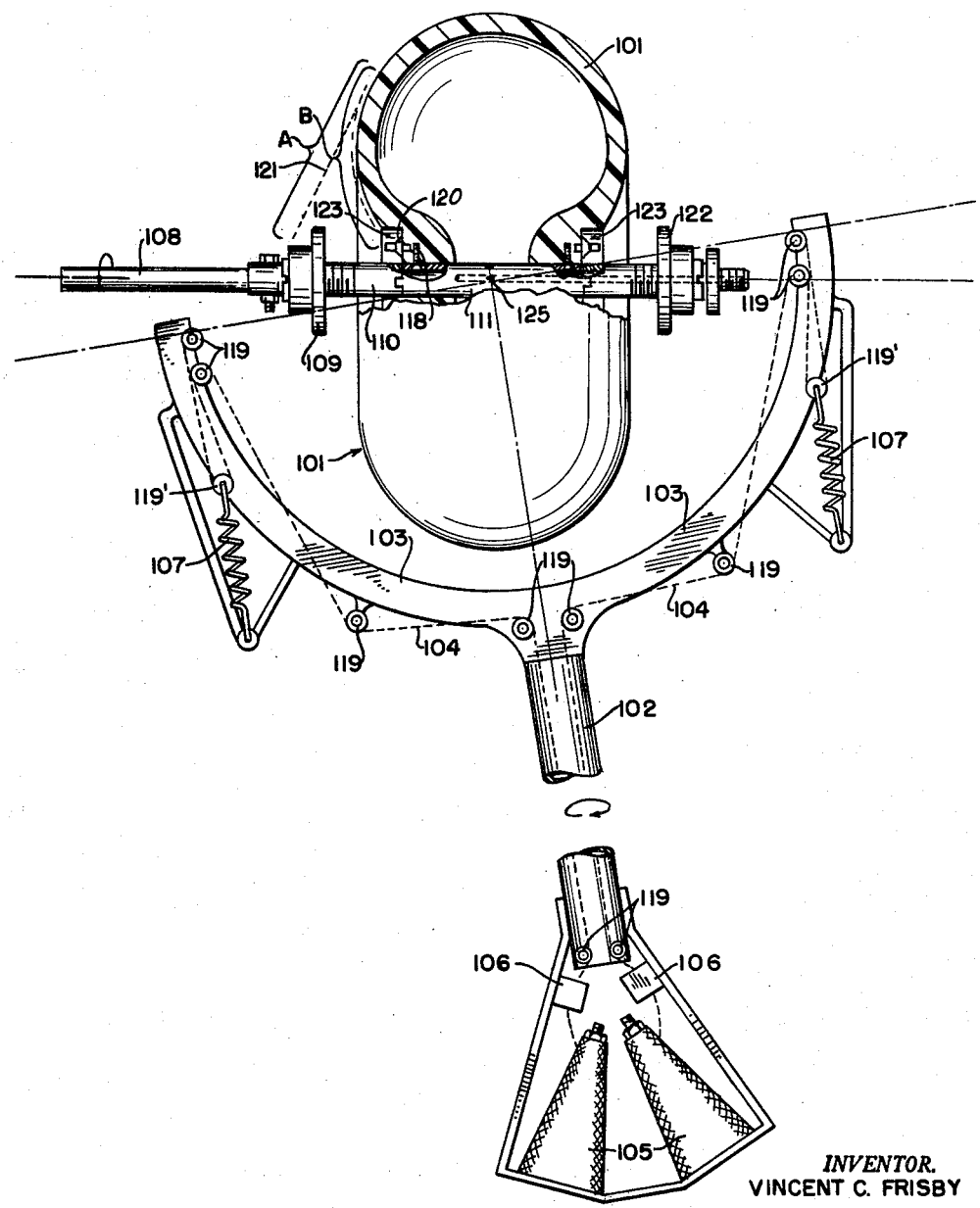
FIGURE 5 is another schematic view, partly in section, representing another embodiment of the tire building apparatus of the invention.

In the embodiment shown in FIG. 5 of the drawings a mold 101, similar to the mold 1 of FIG. 1, is supported by a splined sleeve 110 on a spindle 108 which is rotated by its own drive motor (not shown) in the direction indicated by the arrow. This sleeve also carries two axially positionable hubs 109 and 122, for the purpose described above in connection with the embodiment shown in FIG. 1. The spindle 108 can be provided, as before, with passages for curing media, if desired.

In order to wind cord on the mold 101, another rotatable shaft 102 turns on an axis passing through the centroid 125 of the tire mold and carries two winding arms 103 which extend partway around the mold on opposite sides. This shaft is preferably hollow and is turned by a suitable drive motor, not shown, the speed of which can be accurately controlled with reference to the speed of the spindle 108. Two cords 104 are fed through the hollow shaft 102 from supply cones 105 which are mounted on the shaft so as to rotate with it, and suitable dekinking and tensioning devices 106 are provided to remove kinks and feed the cords with a predetermined tension.

From the shaft 102 the cords 104 each pass over suitable fixed pulleys 119 mounted on the two arms 103, respectively, and also over corresponding movable pulleys 119' attached to tensioning devices 107 which are also mounted by suitable means on the arms 103, the latter devices being capable of maintaining the desired cord tension as the cord is wound about the mold 101. The final pulleys 119 near the ends of the arms 103 are located so that the cords pass inwardly therefrom towards the tire mold and the hubs 109 and 122 in a plane passing through the hubs and the centroid 125 of the mold.

In operation, the spindles 108 and 102 are rotated at speeds, having a selected relationship, so that the mold is turned by the spindle 108 while the cords are wound about it by the arms 103. As previously described in connection with FIG. 1, the hubs 109 and 112 intercept the cords as they are wound about the mold so that the length of each cord is sufficient to permit it to be moved inwardly along the inner portion of the mold surface when the hubs are moved to their inner positions, i.e. the distances A and B are substantially equal.

After the winding is completed, the two hubs 109 and 122 are released and moved inwardly into the recesses 123 in the mold and after this is done, the tire mold can be removed from the spindle for further processing. In certain instance, it may be desirable to pierce the tire through the bead portion prior to curing with a plurality of holes made by bolts 120, which pass through holes in the flanges of the hubs 109 and 122, in their inner positions. This will permit the tire to be bolted to a wheel to maintain a completely airtight seal. As in the case of FIGS. 2 to 4 inclusive, the hubs 109 and 122 can be adjusted axially inwardly from initial outer positions as winding proceeds to compensate for the building up on the cord layers on those hubs.

Although the invention has been described herein with reference to specific embodiments, many modifications and variations therein will readily occur to those skilled in the art. For example, in the embodiment shown in FIG. 1, although only one cord supply position is shown, it is to be understood that a plurality of such cord supply positions may be located radially about the axis of bodily rotation of the tire mold whereby a plurality of cords may be simultaneously found upon the mold. Also, even though the preferred embodiment is illustrated as having a single power means for driving both the vertical drive shaft 6 and the mold axle 24, it is contemplated that a separate power means may be provided for driving each of them. Likewise, in the machine of FIG. 5, a single power means may be arranged to drive both the shaft 102 and the spindle 108 instead of using two separate power means as described. In addition, although only a pair of cord winding arms are illustrated in FIG. 5, it may be desirable to provide three, four, or even more winding arms, whereby many cords may be wound at the same time in order to complete the winding in as short a time as possible for rapid production of tires. It should also be pointed out that the cord supply arrangement shown in FIG. 1 provides a ready means for pre-treating the cord as it is being wound by passing it through a bath, for example, to impregnate the cord with some substance such as for example liquid latex. It is also contemplated that the cord may be in the form of a continuous metallic wire and may also be in the form of a flat ribbon to further reduce the time required to wind a tire. Accordingly, all such variations and modifications are included within the intended scope of the invention as defined by the following claims.

In order to build a tire carcass of the requisite strength and impart the desired properties to it, it is preferable to cover the mold 1 with a layer or sheet of rubber RS before starting the winding operation, either by stretching pieces of uncured sheet rubber over the mold and temporarily cementing them to the mold surface, or by spraying liquid rubber on the mold to achieve a sheet of varying thickness. The cords, pretreated as may be necessary to secure the necessary matrix of rubber in the tire, are then wound upon the layer RS as indicated in FIG. 3. If desired, successive layers of rubber, including an outer layer or sheet, RS', can be placed or sprayed on the cord as is well understood in the art. Specially prepared rubber sheets may, for instance, be placed in the tread area of the tire to build up the tread of the tire and one variation would be to wind these tread sheets in planes parallel or very nearly parallel to the center line of the tread. In the final molding and curing steps, the assembly of cord and rubber is vulcanized together to form the tire, using the pressures and temperature necessary for the type of rubber compounds used to build the tire.

As is well understood in the art the wound tire body can be cured by heat under pressure applied in a suitable manner either externally or internally of the tire body. In the latter case the curing medium such as steam, for example, can be supplied to the interior of the tire body through the passage 30 in the axle 24 through a suitable fixture 27 and distributing passages 25. As is also well known, heated compressed air can be used for the same purpose.

As described previously, the mold can be sectionalized. This configuration is shown in FIGURE 6 which is similar to the tire winding mechanism of FIGURE 1 except that the idler gear 25 has been omitted, meaning that the mold 1 will rotate in a direction opposite to that shown in FIGURE 1. In FIGURE 6 the mold 200 is constructed of a plurality of separate pieces 225, 226, 228, 229 and 230 joined together by internal flanged fittings 227, for example, the entire mold being removably attached to sleeve 234 by radial means 231. In this case, the sleeve need not have the passages 25, as in FIGURE 1, to permit flow of the gas. The sectionalized mold construction of FIGURE 6 can be used with any of the winding mechanisms of FIGURES 1–5 previously described.

What is claimed is:

1. Apparatus for winding reinforcement cord on a tire mold comprising a tire mold, rotatable mold support means adapted to rotate the tire mold bodily about the axis of said means, cord supply means to supply reinforcement cord toward the center of bodily rotation of the mold on the support means and in a plane lying at an angle to the mold axis, shaft means for rotatably mounting the mold on said support means, drive means for providing simultaneous rotation of the mold support means and said shaft means with respect to the cord supply means, and means on said shaft means positioned on each side of the mold for engaging and supporting the cord as it is wrapped on said mold.

2. In the combination of claim 1, means for adjustably positioning said last means inwardly toward said mold in small increments.

3. In the combination of claim 1, said mold having axially aligned, diametrically opposed recesses, said last means being finally positionable in said recesses.

4. In the combination of claim 1, said last means comprising hub members threadedly mounted on said shaft means and means for axially positioning said hub members inwardly toward said mold in increments for rotating said hub means.

5. In the combination of claim 1, said last means including hub members, means for positioning said hub members axially of said shaft means to an initial outward position and means for positioning said hub members in a final inward axial position adjacent said mold, the straight line distance between tangency on the hub members in their outer position tangent points on the mold surface for the cords being equal to the distance along the mold surface from the same points of tangency when the hub members are moved to their final inward position.

6. Apparatus for winding reinforcement cord on a tire mold comprising rotatable mold support means adapted to rotate a tire mold about its axis, a pair of cord holding hubs mounted on the mold support means each positionable at an outer position axially spaced from the mold surface and an inner position against the mold such that the straight line distance between the hub in its outer position and the tangent point on the mold surface is equal to the distance along the mold surface from the hub to the same point on the mold surface when the hub is in its inner position, cord supply means adapted to supply reinforcement cord in a path, toward the centroid of a mold mounted on the support means, lying in a plane which lies at an angle to the mold axis and is tangent to both hubs in their outer positions, and drive means for providing relative rotation between the mold support means and the cord supply means about an axis passing through the mold.

7. Apparatus for winding reinforcement cord on a tire mold comprising a spindle adapted to support a tire mold, a support member supporting the spindle for rotation about its axis, cord supply means for supplying reinforcement cord from a fixed position toward the centroid of a mold mounted on the spindle and in a plane lying at an angle to the spindle axis, drive means for rotating the support member and the spindle about an axis passing through the centroid of the mold and perpendicular to the plane in which the reinforcement cord is supplied to the mold, means for positioning said support member at different angles to said last axis, and connecting means linking the drive means and the spindle for driving the spindle in timed relation to the rotation of the support member.

8. Apparatus for winding reinforcement cord on a tire mold comprising a spindle adapted to support a tire mold, a crescent-shaped arm supporting the spindle near one end for rotation about the axis of said arm, a support member adapted to hold the crescent-shaped arm at any of a plurality of angular orientations of the spindle with respect to a reference plane, cord supply means for supplying reinforcement cord from a fixed position toward the centroid of a mold mounted on the spindle and in a plane lying at an angle to the spindle axis, drive means for providing relative rotation between the support member and the cord supply means about an axis passing through the mold and perpendicular to the plane in which the reinforcement cord is supplied to the mold, and means for rotating the spindle in timed relation to the rotation of the support member.

9. Apparatus for winding reinforcement cord on a tire mold comprising a spindle adapted to support a tire mold, a support member supporting the spindle for rotation about the axis of the support member, cord supply means for supplying reinforcement cord from a fixed position toward the centroid of a mold mounted on the spindle and in a plane lying at an angle to the spindle axis, a base member, a drive-shaft rotatably supported in the base member and affixed to the support member for providing relative rotation between the support member and the cord supply means about an axis passing through the centroid of the tire mold and perpendicular to the plane in which the reinforcement cord is supplied to the mold, a stationary gear member surrounding the drive-shaft, a pinion eccentrically carried by the shaft engaging the stationary gear member, and connecting means linking the pinion and the spindle for rotating the spindle about its axis in timed relation to the rotation of the support member.

10. Apparatus for winding reinforcement cord on a tire mold comprising rotatable mold support means adapted to rotate a tire mold about its axis, a pair of cord engaging hubs mounted on the mold support means each positionable at an outer position axially spaced from the mold surface and an inner position against the mold such that the straight line distance between the point of tangency on the hub in its outer position and the tangent point on the mold surface is equal to the distance along the mold surface from the hub to the same point on the mold surface when the hub is in its inner position, rotatable cord supply means having an arm adapted to move about the tire mold as the supply means is rotated on an axis passing through the centroid of the mold, and means for supplying reinforcement cord from the arm toward the mold in a plane tangent to both the hubs in their outer positions and through the centroid of the mold at an angle to the axis of rotation of the mold.

11. The method of constructing a continuous cord tire comprising the steps of: mounting a rigid mold on a spindle, the said mold having the desired shape of the inside of the tire to be maintained during the curing process including inwardly sloping surfaces; positioning a pair of rigid hubs having axle openings therethrough on said spindle, one on each side of said mold and spaced therefrom at the beginning of construction of the tire; applying sheet rubber over the outer surface of said mold; attaching a cord to one of said hubs; rotating said spindle and said mold and simultaneously winding said cord continuously about said mold and onto both said hubs in a winding plane passing through the centroid of said mold and tangent to opposite sides of said hubs to build up layers of cord on said hubs; moving the said hubs progressively inwardly along said spindle toward said mold during said winding; securing the end of said cord to one of said hubs after winding is completed; applying sheet rubber over said cord windings to form with said first applied sheet rubber an assembly of cord and rubber; curing said assembly with heat and pressure; and removing said mold from said assembly so that the said hubs remain secured to said assembly.

12. The method of claim 11, wherein the step of moving said hubs progressively inwardly along said spindle toward said mold during said winding comprises first moving said hubs to intermediate positions and thereafter moving said hubs inwardly to a final curing position wherein the inner layer of said cord is contiguous with the inwardly sloping surfaces of said mold and all layers adjacent said inner layer are under substantially equal tension in the finished tire.

13. The method of claim 11, wherein the said mold comprises a plurality of segments having dimensions permitting removal thereof from said assembly by passing through said openings in said hubs.

14. The method of claim 11, wherein the said mold is constructed of a sacrificial material.

15. The method of claim 14, wherein the said material is frangible and the said mold is removed from said assembly by breaking said mold into pieces sufficiently small as to pass through said openings in said hubs.

16. The method of claim 14, wherein the material is fusible and the said assembly is cured in a female mold having the desired finished shape of the tire while applying fluid pressure and heat to the interior of said assembly, the said material being melted by said cure heat.

17. The method of claim 14, wherein said sacrificial material is dissolvable and the said assembly is cured in a female mold having the desired finished shape of the tire while applying fluid pressure and heat to the interior of said assembly, the said material being dissolved by said fluid.

18. Apparatus for winding reinforcement cord on a tire mold comprising rotatable mold support means adapted to rotate a tire mold about its axis, a pair of cord holding hubs mounted on the mold support means each positionable at an outer position axially spaced from the mold surface and an inner position against the mold such that the straight line distance between the hub in its outer position and the tangent point on the mold surface is equal to the distance along the mold surface from the hub to the same point on the mold surface when the hub is in its inner position, cord supply means adapted to supply reinforcement cord in a path, toward the centroid of a mold mounted on the support means, lying in a plane which lies at an angle to the mold axis and passes through both the hubs in their outer positions, and drive means for providing relative rotation between the mold support means and the cord supply means about an axis passing through the mold.

19. Apparatus for winding reinforcement cord on a tire mold comprising a spindle adapted to support a tire mold, a support member supporting the spindle for rotation about its axis, fixed cord supply means for supplying reinforcement cord from a fixed position toward the centroid of a mold mounted on the spindle and in a plane lying at an angle to the spindle axis, drive means for rotating the support member and the spindle about an axis passing through the centroid of the mold and perpendicular to the plane in which the reinforcement cord is supplied to the mold, means for positioning said support member at different angles to said last axis and connecting means linking the drive means and the spindle for driving the spindle in timed relation to the rotation of the support member, whereby the cord can be applied at any one of a plurality of angles to molds of different sizes.

20. Apparatus for winding reinforcement cord on a tire mold comprising a spindle adapted to support a tire mold, a crescent-shaped arm supporting the spindle near one end for rotation about the axis of said arm, a support member adapted to hold the crescent-shaped arm at any of a plurality of angular orientations of the spindle with respect to a reference plane, fixed cord supply means for supplying reinforcement cord from a fixed position in said plane toward the centroid of a mold mounted on the spindle, said plane lying at an angle to the spindle axis, drive means for providing relative rotation between the support member and the cord supply means about an axis passing through the mold and perpendicular to the plane in which the reinforcement cord is supplied to the mold, and means for rotating the spindle in timed relation to the rotation of the support member, whereby the cord can be applied at any one of a plurality of angles to molds of different sizes.

21. Apparatus for winding reinforcement cord on a tire mold comprising a spindle adapted to support a tire mold, a support member supporting the spindle for rotation about the axis of the support member, cord supply means for supplying reinforcement cord from a fixed position toward the centroid of a mold mounted on the spindle in a plane lying at an angle to the spindle axis, a base member, a drive-shaft rotatably supported in the base member and affixed to the support member for providing relative rotation between the support member and the cord supply means about an axis passing through the centroid of the tire mold and perpendicular to the plane in which the reinforcement cord is supplied to the mold, a stationary gear member surrounding the driveshaft, a pinion eccentrically carried by the shaft engaging the stationary gear member, and connecting means linking the pinion and the spindle for rotating the spindle about its axis in timed relation to the rotation of the support member, whereby the cord can be applied at any one of a plurality of angles to molds of different sizes.

22. Apparatus for winding reinforcement cord on a tire mold comprising rotatable mold support means adapted to rotate a tire mold about its axis, a pair of cord engaging hubs mounted on the mold support means each positionable at an outer position axially spaced from the mold surface and an inner position against the mold such that the straight line distance between the hub in its outer position and the tangent point on the mold surface is equal to the distance along the mold surface from the hub to the same point on the mold surface when the hub is in its inner position, rotatable cord supply means having an arm adapted to move about the tire mold as the supply means is rotated on an axis passing through the centroid of the mold, and means for supplying reinforcement cord from the arm toward the mold in a plane passing through both the hubs in their outer positions and through the centroid of the mold at at an angle to the axis of rotation of the mold.

References Cited by the Examiner
UNITED STATES PATENTS

| | | | |
|---|---|---|---|
| 969,131 | 8/10 | Cobb | 156—414 X |
| 1,161,906 | 11/15 | Stultz | 156—414 |
| 1,294,063 | 2/19 | Dickinson | 156—117 |
| 1,627,799 | 5/27 | Midgley | 156—123 X |
| 2,071,864 | 2/37 | Myers | 156—110 |
| 2,352,055 | 6/44 | Witt | 156—397 |
| 2,518,967 | 8/50 | Witt | 156—397 |
| 2,906,314 | 9/59 | Trevaskis | 156—397 X |
| 2,915,102 | 12/59 | Alexeff et al. | 156—123 X |

FOREIGN PATENTS

| | | |
|---|---|---|
| 808 | 1913 | Great Britain. |
| 498,507 | 1939 | Great Britain. |
| 211,342 | 7/57 | Australia. |

EARL M. BERGERT, *Primary Examiner.*